United States Patent [19]
Cho

[11] 3,791,524
[45] Feb. 12, 1974

[54] TISSUE COLLECTOR

[75] Inventor: Nakwon Cho, Knoxville, Tenn.

[73] Assignee: The United States of America as represented by the United States Atomic Energy Commission, Washington, D.C.

[22] Filed: Apr. 13, 1972

[21] Appl. No.: 243,786

[52] U.S. Cl.................. 210/232, 210/444, 210/454
[51] Int. Cl............................................. B01d 35/02
[58] Field of Search... 210/232, 444, 443, 454, 475, 210/234, DIG. 23

[56] References Cited
UNITED STATES PATENTS
2,991,885  7/1961  Gutkowski..................... 210/444 X
2,955,712  10/1960  Gutkowski..................... 210/444 X
1,636,285  7/1927  Catron.............................. 210/232

Primary Examiner—Samih N. Zaharna
Assistant Examiner—F. F. Calvetti
Attorney, Agent, or Firm—Roland A. Anderson; John A. Horan; L. M. Deckelmann

[57] ABSTRACT

A tissue collector is provided which is designed especially for obtaining a fetus in a sterile condition while permitting the removal of a specimen for pathological study. The collector is economical, compact and lends itself to transit. The collector can readily be cleaned and sterilized for reuse.

1 Claim, 1 Drawing Figure

PATENTED FEB 12 1974 3,791,524
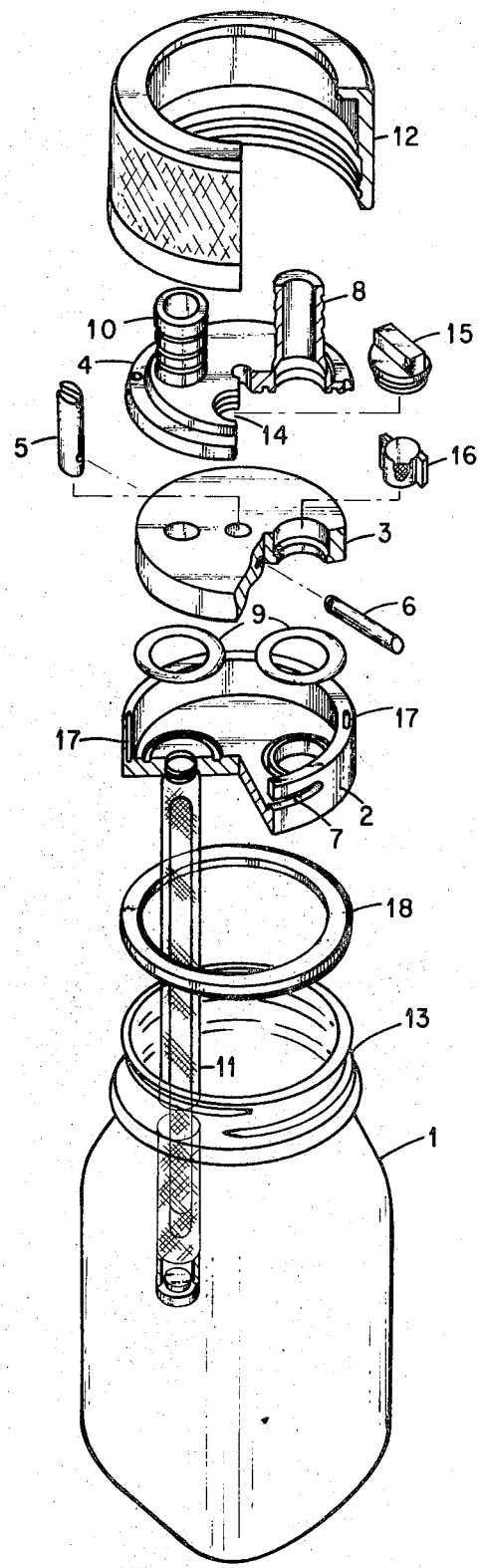

TISSUE COLLECTOR

BACKGROUND OF THE INVENTION

This invention was made in the course of, or under, a contract with the U. S. Atomic Energy Commission.

In the Molecular Anatomy Program (MAN), certain cancer research requires the use of a human fetus. With the advent of legalized abortion in some states, fetuses are now available but means must be provided for collection and transit in a sterile state. Further, means must be provided for the hospital to obtain a pathological specimen for study without exposing the fetus to the atmosphere. There exists a need to provide such a means and the present invention was conceived to meet this need in a manner to be described hereinbelow.

SUMMARY OF THE INVENTION

It is an object of the present invention to provide a sterile tissue collector which permits collection of specimen material without exposure to the atmosphere and which is adaptable for transit between collection and research facilities.

It is another object of this invention to provide a sterile tissue collector which permits withdrawal of a portion of a specimen therefrom without exposure of the remaining portion of specimen to the atmosphere.

The above objects have been accomplished in the present invention by providing a sterile tissue collector comprising a reservoir having one open end for collection and retention of a specimen; a valve assembly covering the reservoir opening and having two fixed disks and one rotatable disk therebetween; the valve assembly further containing an inlet for passage of specimen materials into the reservoir, the inlet being partially covered by a screen for collection and retention of a portion of the solid material passing therethrough and an outlet including means adapted to separate the remaining portion of the solid material from the liquid material passing therethrough; and means for rotating the rotatable disk of the valve covering to provide opened and closed positions of said inlet and outlet.

The sample collector is simply placed in the vacuum line of a commercial device used in carrying out an abortion, and after collection of the fetal materials, the liquids are displaced with a suitable, sterile media. The sealed, sterile specimen is then ready for shipment to a research analytical facility.

BRIEF DESCRIPTION OF THE DRAWING

The single FIGURE in the drawing is an exploded diagram, part in section, illustrating the tissue collector of the present invention.

DESCRIPTION OF THE PREFERRED EMBODIMENT

Referring now to the single FIGURE in the drawing, the collector is seen in exploded form. A conventional mason jar 1 serves as the reservoir (container) for receiving the specimen. The valve is made up of disks (plates) 2, 3 and 4, each disk provided with an inlet aperture and an outlet aperture. Disks 2 and 4 are stationary while disk 3 is adapted to rotate therebetween. Disk 3 is rotated by means of a pin 5 which is keyed to disk 3 by a locking pin 6. The limits of travel for disk 3 are controlled by movement of the end of the locking pin 6 in slot 7 of disk 2 and may be about 90° for example.

The disk 3 is thus rotatably mounted to move to and from a position where its apertures are in register with the apertures in the disks 2 and 4. A fluid seal is maintained between disks 2, 3 and 4 by means of "O" rings 9 on each side of disk 3 (for clarity, the "O" rings are shown on one side only). Pins 17 are provided to assure that the valve components are assembled in a particular way and to align proper inlet and outlet apertures in the disks 2 and 4. Disk 3 is preferably fabricated from Teflon because of its inherent lubricating properties. Other valve components are fabricated from stainless steel for convenience and to obtain corrosion resistance during sterilization. Thus, the stainless steel disk 4 makes electrical conduction possible between inlet and outlet hose which are attached to the inlet 8 and outlet 10. Therefore, the electrical conductivity between the inlet 8 and outlet 10 permits grounding of the entire device to avoid "static" shock to a mother during an abortion when tygon tubings used with the device are designed for conductivity.

Fluids enter reservoir 1 by way of inlet 8 and exit by way of outlet 10 through the associated apertures in the valve disks 2, 3 and 4. Solids which enter the reservoir by way of inlet 8 are retained in reservoir 1 by a porous filter member 11. The filter member 11 partitions the interior of the reservoir 1 into a first volume inside the member 11 which communicates with the outlet 10 and into a second volume exterior to the member 11 which communicates with the inlet 8. The valve assembly is held by a ring 12 which is threadably engageable with the top 13 of reservoir 1. Gasket 18 assures an effective seal between the reservoir and the valve assembly. When collection is completed, the liquid in reservoir 1 is displaced by a sterile media and the reservoir sealed by rotating pin 5 and disk 3 affixed thereto 90°, the limit provided by pin 6 in the slot 7.

During collection, a specimen for pathological study is collected by a screen 16 which partially covers the aperture in disk 3 which aperture is then in alignment with the inlet 8. This specimen may be removed from screen 16 when disk 3 is turned to the closed position. In the valve closed position, plug 15 may be removed from penetration 14 in disk 4 to expose the specimen collected by screen 16 such that the specimen may be removed therefrom. This is accomplished only when inlet 8 and outlet 10 are in the closed position and thus the collected sterile solid contents (the remaining portion of the specimen) in reservoir 1 are sealed from the atmosphere.

Once the collector is sealed and the pathological specimen obtained, the collector is ready for transport by any suitable means to a facility in need of such materials. After use, the entire collector may be sterilized for reuse or, if desired, only the valve portion. Since the reservoir is a common commercial item, it may be desirable to replace the reservoir after its use with another sterilized reservoir.

It can be seen from the above description of the present invention that the stated objects thereof have been accomplished by the described structure.

This invention has been described by way of illustration rather than limitation and it should be apparent that it is equally applicable in fields other than those described.

I claim:

1. A valved receptacle for collection of a tissue specimen comprising an open-ended container and a valve assembly sealably mounted to the open end of said container, said valve assembly including three stacked plates, each of said plates having a pair of throughgoing apertures, the inner and the outer of said plates being rigidly mounted with their respective apertures in register, the intermediate of said plates being rotatably mounted to move to and from a position where its apertures are in register with those in said inner and outer plates, an elongated filter partitioning the interior of said container into a first volume communicating directly with one of said apertures in said inner plate and a second volume communicating directly with the other aperture in said inner plate, an inlet hollow tube affixed to the outer surface of said outer plate and communicating with one of said apertures in said outer plate, an outlet hollow tube affixed to the outer surface of said outer plate and communicating with the other aperture in said outer plate, said filter within said container permitting the separation of the tissue specimen collected in said container through said inlet tube and valve assembly from any liquid collected with said specimen and replacement of said liquid with a sterile media, said liquid being dispensed through said valve assembly and outlet tube, after which said intermediate plate is adapted to be rotated to seal the interior of said container from the atmosphere, a removable screen positioned in the aperture in said intermediate plate associated with said inlet tube which screen partially covers this aperture for collection of a portion of said tissue specimen for pathological study, and a removable plug mounted in another aperture in said outer plate, such that when said intermediate plate is rotated to its position to seal the interior of said container, said another aperture of said outer plate is in register with the intermediate plate aperture holding said removable screen thus permitting removal of said specimen collected by said screen through said another aperture when said plug is removed.

* * * * *